United States Patent [19]

Groth

[11] 4,331,343
[45] May 25, 1982

[54] WHEEL CONSTRUCTION AND ARRANGEMENT

[75] Inventor: Willis G. Groth, Geneva, Ill.

[73] Assignee: H. A. Phillips & Co., St. Charles, Ill.

[21] Appl. No.: 153,216

[22] Filed: May 27, 1980

Related U.S. Application Data

[63] Continuation of Ser. No. 928,720, Jul. 27, 1978, abandoned.

[51] Int. Cl.³ .............................................. B62D 21/00
[52] U.S. Cl. .................................... 280/80 R; 280/268
[58] Field of Search ................. 280/80 R, 268, 271, 280/272, 80 A, 80 B, 81 R, 11.1 G, 11.23, 11.27, 11.28; 16/18 R, 18 A; 212/13, 14, 15, 16, 61

[56] References Cited

U.S. PATENT DOCUMENTS

| | | | |
|---|---|---|---|
| 2,261,465 | 11/1941 | Grange | 16/18 R |
| 2,688,410 | 9/1954 | Nelson | 212/14 |
| 2,696,770 | 12/1954 | McKesson | 280/81 R |
| 3,711,055 | 1/1973 | Schultz | 280/80 R |
| 3,806,986 | 4/1974 | Wentworth | 16/18 R |
| 4,138,127 | 2/1979 | Kimmell | 280/11.23 |

Primary Examiner—Joseph F. Peters, Jr.
Assistant Examiner—John A. Carroll
Attorney, Agent, or Firm—Richard G. Lione

[57] ABSTRACT

A wheel construction and arrangement wherein a wheel which has a relatively wide surface contact tire, pneumatic, for example, is mounted for rotation in a yoke which extends in the direction of travel of the vehicle which the wheel supports. The yoke is tiltable on a substantially horizontal axis which extends below the wheel axis and relatively close to the supporting surface. Lateral displacement of the body to which the yoke (and wheel) is attached will cause the wheel to tilt in that direction and any subsequent longitudinal motion in either direction of wheel travel will result in the wheel righting itself; i.e., correcting for that displacement. Conversely, tilting of the yoke and wheel to a certain degree will cause the wheel to travel in a precisely prescribed arc. The vertical plane in which the tilt axis lies passes through the area of tire contact with the supporting surface regardless of the angle of tilt.

8 Claims, 6 Drawing Figures

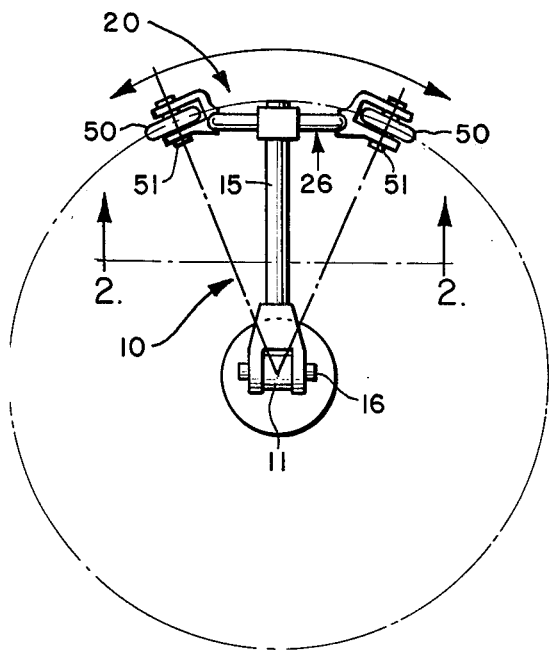
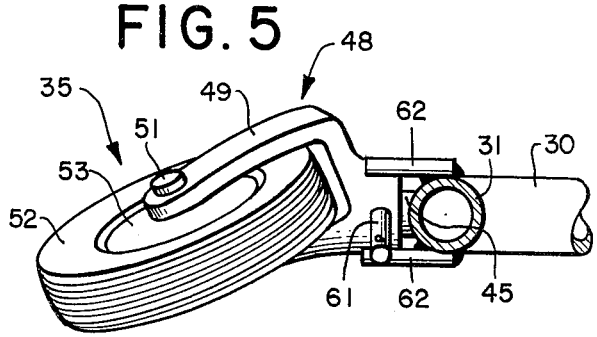
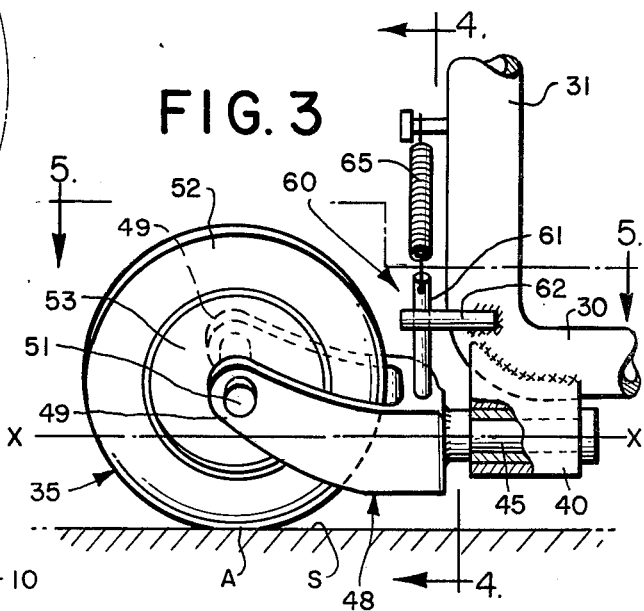
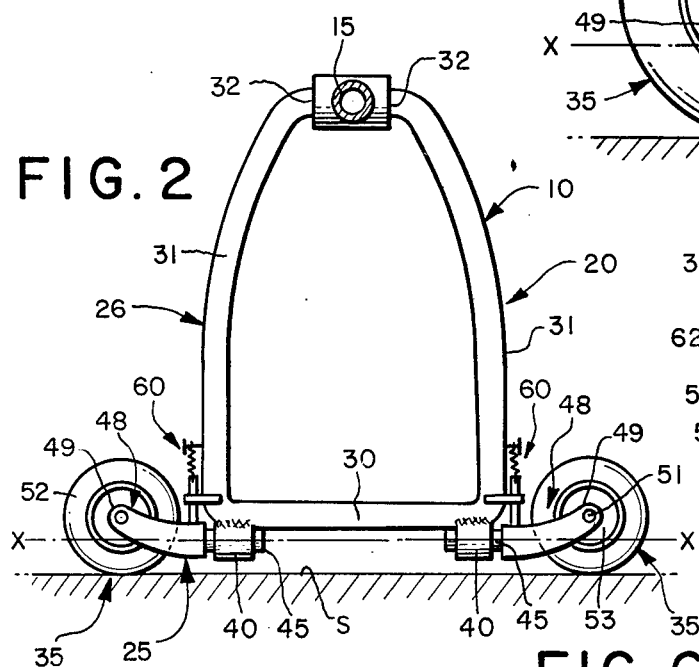
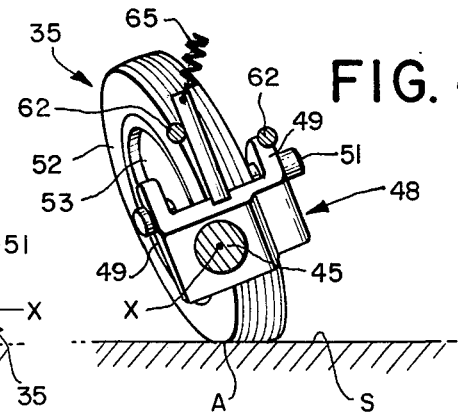
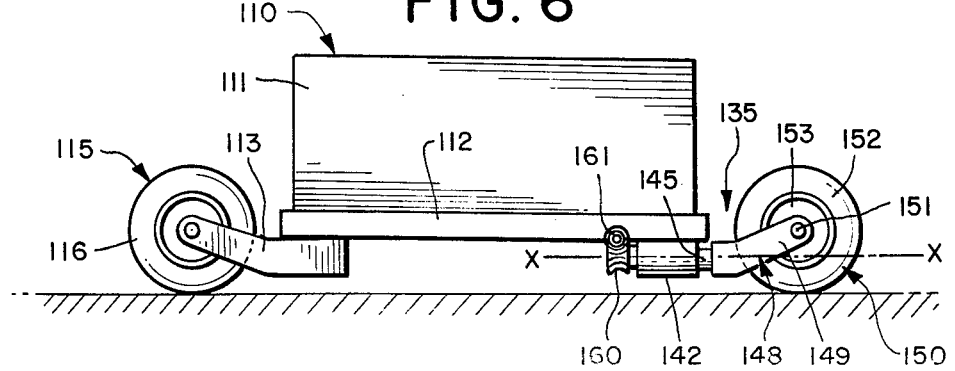

WHEEL CONSTRUCTION AND ARRANGEMENT

This application is a continuation of application Ser. No. 928,720, filed July 27, 1978, and now abandoned.

FIELD OF THE INVENTION

This invention is in the field of wheeled vehicles. More specifically, it is embodied in a wheeled vehicle designed for travel on normal surfaces.

BACKGROUND OF THE INVENTION

It has long been necessary with industrial equipment such as center pivot gantry cranes to provide a track-guided wheel truck to support the outer end of the gantry beam. The wheel truck conventionally has steel wheels which ride a raised track as the truck moves in a circular path while supporting the gantry beam in its operational travel.

The track is employed to keep the truck in its proper path beneath the arcuate path of the beam end. If the truck moves or tends to move from this path, particularly while the crane is carrying a load, the beam support structure and truck are subjected to substantial stress.

As an alternative to the track guided wheel construction solution it has been demonstrated that the use of castered wheels fore and aft of a wheel truck will permit the truck to follow the beam end through its arcuate path. However, the reversal of castered wheels each time the crane reverses direction is, at least momentarily, destabilizing. It can result in high stresses being developed in the crane and truck. Furthermore, it is recognized that castered wheels, particularly in such a high load environment, have a tendency to function improperly and not reverse correctly time after time, thus engendering equipment breakdown.

SUMMARY OF THE INVENTION

It is an object of the present invention to provide a new and improved wheel construction and arrangement for a vehicle which finds particularly advantageous application in a wheel truck for supporting the beam of a center pivot gantry crane or the like.

It is another object to provide a new and improved wheel truck mechanism which accurately follows an arcuate path under a rotating gantry beam, for example, and does so without the benefit of a guiding track or castered wheel reversal.

It is still another object to provide a new and improved wheel truck mechanism wherein the truck wheels automatically adopt a tilt attitude which causes the truck to travel in precisely the arc in which the gantry beam end it is supporting is traveling.

It is yet another object to provide a new and improved wheeled vehicle in which positive tilting of its wheels in a prescribed manner permits the vehicle to move laterally without initial longitudinal movement; i.e., for example, to move away from a curb without scraping against the curb in an initial longitudinal movement.

The foregoing and other objects are realized in accord with the invention by providing a wheeled vehicle which, in its preferred embodiment, comprises a wheel truck mechanism having a frame which supports the outer end of a beam in a center pivot gantry crane or the like. As the crane rotates during operation, whereby the beam moves in an arc about its center pivot, pneumatic tire wheels mounted on the frame according to the invention tilt in the direction of any lateral displacement. The truck mechanism is constructed so that the tilt axis of the wheel lies in a vertical plane which intersects the area of surface contact of the pneumatic tire. The tilt axis extends substantially parallel to the surface and well below the axis of rotation of the tire; i.e., as close to the surface as is practically possible.

When the crane is rotated in a conventional manner, lateral forces are naturally brought to bear on a wheel truck. It is, in effect, forced to move in a direction not on the longitudinal axis of the truck but rather in an arc away from this longitudinal axis. To be precise, an inward (toward the crane pivot axis) force component is brought to bear on the truck. The arrangement of the wheel tilt axis is such that this inward force component immediately causes the wheel to tip. Tilting of the wheel, which is preferably a pneumatic tire but might also have a solid tire (it is important only that it have a generally convex, relatively wide ground surface), results in the tire acting like a rolling cone; i.e., the wheel move in an arc. The construction of the truck mechanism according to the present invention is such that the arc in which the wheel rolls automatically corresponds to the arc in which the truck is moved by the rotation of the gantry crane.

With a pneumatic tire, surface contact is over a substantial area. The tilting causes this contact area to move in the direction of tilt. Because it is a substantial area, however, rather than line or point contact, some portion of the area is still intersected by the vertical plane through the tilt axis, thus reducing greatly any tendency of the wheel to overturn.

In an alternative form of wheeled vehicle embodying features of the invention, the wheel construction and arrangement is used to guide the vehicle rather than follow it. The example which will be described in detail hereinafter is a four-wheel material handling truck. By mounting each of its two front pneumatic tire wheels on tilt axes in the manner previously discussed, and providing means for positively rotating those axes to simultaneously tilt the wheels, the vehicle can be moved forward and away from a curb with no scraping side contact of the front wheel against the curb.

BRIEF DESCRIPTION OF THE DRAWINGS

The construction and operation of the wheel construction and arrangement for a vehicle embodying features of the invention is illustrated more or less diagrammatically in the drawings, in which:

FIG. 1 is a top plan view of a gantry crane incorporating a wheel truck mechanism embodying features of the invention;

FIG. 2 is an enlarged end view of the crane wheel truck mechanism illustrated in FIG. 1;

FIG. 3 is a further enlarged side elevation of a wheel construction and arrangement in the wheel truck mechanism hereinbefore referred to, with the wheel tilted according to the invention;

FIG. 4 is a view taken along line 4—4 of FIG. 3;

FIG. 5 is a sectional view taken along line 5—5 of FIG. 3; and

FIG. 6 is a side elevational view of a simple four wheel material handling vehicle with two front wheels constructed and arranged according to the present invention.

DESCRIPTION OF THE PREFERRED EMBODIMENT

Referring now to the drawings, and particularly to FIGS. 1 and 2, a center pivot gantry crane of broadly conventional construction is illustrated generally at 10. The crane comprises a vertical center column 11.

Extending horizontally from the top of the column 11 is a crane bridge or beam 15. The beam 15 is pivotally connected to the top of the column 11 on a horizontal axis, as seen at 16. In effect, it defines a radii of a circle through which the beam 15 pivots in conventional fashion.

The beam 15 mounts a suitable hoisting mechanism (not shown) for accomplishing the lifting and radial shifting of the loads. To support the outer end of the beam 15, particularly while performing its load handling functions, a wheel truck 20 is provided.

The wheel truck 20 provides rolling support for the beam 15 as it is pivoted around the axis of the column 11. In following its rotational path, the beam 15 may pull the truck 20 with it or vice versa, depending upon where the drive unit is disposed. Since the longitudinal axis of the truck is conventionally normal to the beam 15, movement of the end of the beam 15 is in a circle. The truck 20 is thus drawn in a circle, subjecting it to lateral stress of some order. The greater the load carried by the beam 15, the greater the frictional resistance of the truck 20 to lateral movement for travel in a circle corresponding precisely to the path of the beam end, and the greater the lateral stress to which the truck would be subjected if the wheels were fixed.

According to the present invention, the truck 20 incorporates an improved wheel mechanism 25 which effectively eliminates the lateral stresses, at least to the extent which might be harmful. As will hereinafter be described in detail, regardless of which direction the wheel truck 20 moves at the instance of the rotating column 11 and beam 15, the wheel mechanism 25 is effective to precisely track the arc defined by the point on the beam to which the truck 20 is attached.

As best seen in FIG. 2, the wheel truck 20 also includes a frame 26 which is supported by the wheel mechanism 25. The truck frame 26 is generally triangular and fabricated of structural steel. It includes a horizontal base member 30 and upwardly and inwardly curved side members 31. The side members 31 are connected to the beam 15 in a conventional manner at 32.

The wheel mechanism 25 comprises a pair of wheel units 35 constructed and arranged, according to the invention. The wheel units 35 are mounted, and face in opposite directions, on corresponding ends of the base member 30 where they join the side members 31.

Each of the wheel units 35 includes a journal block 40 secured by welding to the bottom of a corresponding end of the horizontal base member 31. Each journal block 40 has a bore extending therethrough in which a horizontal wheel mounting shaft 45 is journaled.

The shaft 45 is rotatable on a tilt axis X in the journal bore. To the outer end of the shaft 45 is welded a yoke 48 having parallel legs 49. The legs 49 are effectively disposed at an angle of approximately 30° "upwardly" from the axis X in the present illustration. The angle may vary somewhat in practice.

The legs 49 are also disposed at an angle "inwardly" of the axis X which places them tangent to the circle or arc of rotation of the truck 20. A wheel 50 is mounted on an axle 51 extending between the legs 49 at their outermost ends. The wheel 50 includes a pneumatic tire 52 mounted on a rim 53. The surface of the tire 52 is designed to rest and roll on the normally flat supporting surface S of a factory floor, for example. The wheel 50 is also tangent to the aforementioned circle, of course.

In practice, the axis X is disposed approximately one-third (⅓) to one-half (½) of the distance from the surface S to the axle 51. In the present illustration the axis X lies in a horizontal plane which intersects the pneumatic tire 52 at approximately the point where it mates with the rim 53.

In FIG. 2, the wheel 50 of the "leading" wheel unit 35; i.e., the forwardmost wheel unit when the crane 10 is rotatable in a counter clockwise (CCW) direction, is illustrated in its upright, vertical position. When the crane is rotated CCW about the column 11, however, the wheel 50 immediately tilts inwardly to a tilt angle whereby it traces an arc defined by the end of the beam 15. This tilting is caused by the construction and arrangement of the wheel 50 on its tilt axis X and the fact that as the crane 11 rotates this wheel unit 35 is subjected to radial forces acting inwardly of the crane. The trailing wheel unit 35; i.e., the rearwardmost wheel unit when the crane 10 rotates CCW, also automatically adjusts in this manner.

Referring now to FIGS. 3-5, the leading wheel unit 35 is illustrated in (an exaggerated) tilted relationship while tracking the path of the crane 10. The wheel 50 automatically tilts inwardly to an angle whereby an imaginary cone is defined. The tire 52 itself is the base of the cone and the apex of the cone lies on the surface S at a distance inwardly of the tire corresponding to the radius of rotation of the wheel truck 20 as the crane 10 rotates. In effect, the wheel 50 automatically tilts whereby the tire 52 effectively defines a conical rolling surface and this conical rolling surface is such that the wheel 50 rolls precisely around the column 11 in the path of the end of the beam 15. In practice, the greater the load on the beam 15, the more it deflects causing the wheel truck 20 to track on a slightly greater radius. The converse is also true, of course.

Because the tire 52 is a pneumatic balloon tire, it has a relatively large area A in contact with the floor surface S, as seen in FIG. 4. It is, in fact, designed so that this area A lies vertically under the tilt axis X defined by the shaft 45, even with the wheel 50 tilted substantially inwardly. Accordingly, there is little tendency for the wheel 50 to overturn; i.e., flop onto its side, inwardly, for example.

In order to assure that such inward overturning of the wheel 50 does not occur under any circumstances, however, a stop assembly 60 for limiting tilt is provided as best seen in FIG. 2. The stop assembly 60 includes a tilt arm 61 fastened to the yoke 48 and extending vertically upwardly therefrom when the wheel 50 is in vertical relationship. Tilt arm stops 62 are welded to opposite sides of the frame side members 31 at their lowermost ends, so as to bracket the tilt arm 61.

The positioning of the stops 62 is such that the tilt arm 61 engages one or the other of stops when the wheel 50 is tilted to the point where any additional tilting would normally cause it to tip over on its inward side. Thus, this improbable, but nevertheless possible, phenomenon is prevented.

According to the invention, each of the wheels 50 is normally urged into its neutral position, as illustrated in FIG. 2, by a tension coil spring 65 connecting the upper end of the tilt arm 61 to a corresponding frame side member 31. Thus, the tilting of the wheel 50 under sudden changes in load is resiliently counteracted by the spring 65. While the crane 10 may operate for long periods of time without any need for the spring 65, its occasionally necessary neutralizing effect assures optimum stability.

The invention has, to this point, been discussed in the context of a wheel truck 20 for a center pivot gantry crane 10 wherein the wheels 50 tilt to track the path of the truck frame. Regardless of which direction the truck 20 is moved, the wheel units 35 automatically adjust to, and precisely follow, the arcuate travel path.

The invention also contemplates employing the wheel construction and arrangement embodying features of the invention to specific guiding tasks. In the example which is hereinafter discussed, a four wheeled material handling truck incorporates front wheel units embodying features of the invention. When such a vehicle is parked firmly against a curb, for example, positively tilting the front wheel away from the curb and moving the truck in a forward direction results in the vehicle moving away from the curb with virtually no side scraping of the front wheel against the curb.

Referring now to FIG. 6, a material handling truck of broadly conventional construction is illustrated generally at 110. The truck comprises a truck body 111 supported on a horizontally disposed base frame 112. Upwardly and rearwardly extending projections 113 of the frame on opposite sides of the body 111 mount conventional wheels 115 having, in this illustration, pneumatic tires 116 associated therewith.

At the front end of the material handling truck 110 two wheel units 135 embodying features of the present invention are mounted on opposite sides of the frame 112 (only one shown). Each of the wheel units 135 includes a journal block 142 depending from the frame 112. A horizontal wheel mounting shaft 145 is journaled in block 142. The shaft 145 is rotatable on a tilt axis X in the bore.

To the outer end of the shaft 145 is welded a yoke 148, the yoke having parallel legs 149 which extend at an angle of approximately 20° upwardly from the axis. A wheel 150 is mounted on an axle 151 extending between the legs 149 at their forwardmost ends. The wheel 150 includes a pneumatic tire 152 mounted on a rim 153. The tire is designed to roll on the normal, flat supporting surface of a factory floor, for example.

In this application of the invention the axis X extends substantially below the axle 151, although not necessarily so far below it as described in relation to the wheel truck 20 of the crane 10. In the present illustration the axis X lies in a horizontal plane above the point where the pneumatic tire mates with the rim 53.

Each of the shafts 145 has secured thereto a ring gear 160. Interconnecting the ring gears 160 is a worm gear 161 which extends transversely of the body 111 in the frame 112 and is suitably journaled in a conventional manner. Rotation of the worm gear is effective to simultaneously rotate the shafts 145.

Rotation of the shafts 145 in this manner causes the wheels 150 to simultaneously tilt to either the left or the right, in perfect unison. If the wheels are tilted to the left, for example, and the truck 110 moved forwardly (to the right in FIG. 6), the wheel units 135 immediately turn it in an arc to the left. Even if the truck 110 is parked against a right hand curb or other side abutment, for example, this forward movement takes place without scraping the front tires 150 against the curb.

A truck fitted with wheel units 135 at both ends would be able to move away from the curb in a complete "crab". It could also turn in a very short arc if opposite ends are turned in opposite directions.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a wheeled vehicle adapted to travel on a normal surface wherein said vehicle includes a frame, the improvement in a wheel construction and arrangement, comprising:
   a. a wheel rotatable on a normally horizontal axis,
   b. said wheel being mounted for rotation on a structure which extends rearwardly of the wheel relative to a forward direction of vehicle travel,
   c. said structure being connected to the vehicle frame in pivotal relationship for tilting movement about a substantially horizontal tilt axis, and
   d. said tilt axis extending below the axis of wheel rotation between said axis of rotation and the surface on which the wheel travels,
   e. tilting of said wheel about said tilt axis being effective to cause the vehicle to move in an arcuate path in the direction of tilt with the arcuate path having a radius determined by the degree of tilt.

2. The improvement in a wheel construction and arrangement of claim 1 further characterized in that:
   a. said wheel includes a tire,
   b. said tire being so contoured as to have a relatively wide area of contact with said surface transversely of the tire even when tilted at a substantial angle,
   c. said tilt axis lying in a vertical plane which passes through said area of contact both when the wheel axis is horizontal and when said wheel is tilted.

3. The improvement in a wheel construction and arrangement of claim 1 further characterized in that:
   a. said tilt axis lies at a vertical distance below said wheel axis of rotation when the wheel axis is horizontal which is more than one-half of the distance of said surface from said wheel axis.

4. The improvement in a wheel construction and arrangement of claim 1 wherein said wheeled vehicle is designed to travel in an arcuate path during normal operation, further characterized in that:
   a. said wheel is normally disposed in a plane substantially tangent to said arcuate path.

5. The improvement in a wheel construction and arrangement of claim 4 further characterized in that:
   a. said tire is a pneumatic tire.

6. The improvement in a wheel construction and arrangement of claim 2 further characterized by and including:
   a. means normally holding said wheel in vertical relationship whereby its rotational axis is horizontal.

7. The improvement in a wheel construction and arrangement of claim 6 further characterized in that:
   a. said holding means provides a resilient holding force.

8. A wheel truck for movably supporting the radial beam of a center pivot gantry crane, comprising:

a. a truck frame having its longitudinal axis disposed transversely of the beam and adapted to travel in an arcuate path while supporting said beam,
b. two wheel units mounted on said frame generally parallel to said longitudinal axis,
c. each of said wheel units having a wheel rotatable on a normally horizontal axis,
d. one of said wheel units including a wheel mounted for rotation on structure which extends rearwardly of the wheel relative to one direction of vehicle travel and the other wheel unit including a wheel mounted for rotation on structure which extends rearwardly of the corresponding wheel relative to the other direction of vehicle travel,
e. each of said structures being connected to the vehicle frame in pivotal relationship for tilting movement about a substantially horizontal tilt axis,
f. each of said tilt axes extending below the axis of a corresponding wheel axis of rotation between said corresponding wheel axis of rotation and a surface on which the wheel travels but not below its contact with the floor,
g. each of said wheels normally disposed substantially tangent to said arcuate path, and
h. tilting of said wheels about corresponding tilt axes being effective to cause the vehicle to move in said arcuate path in the direction of tilt with the arcuate path having a radius determined by the degree of tilt.

* * * * *